(12) United States Patent
Italiane et al.

(10) Patent No.: US 7,188,567 B1
(45) Date of Patent: Mar. 13, 2007

(54) GAS GENERATION SYSTEM

(75) Inventors: John R. Italiane, Seattle, WA (US); James M. Styner, Kirkland, WA (US); Andrew C. Nguyen, Kirkland, WA (US); Gary S. Gregg, Olalla, WA (US); Gary F. Holland, Snohomish, WA (US); Michael A. Wilson, Kirkland, WA (US)

(73) Assignee: Zodiac Automotive US Inc., Tempe, AZ (US)

( * ) Notice: Subject to any disclaimer, the term of this patent is extended or adjusted under 35 U.S.C. 154(b) by 110 days.

(21) Appl. No.: 10/130,191

(22) PCT Filed: Nov. 10, 2000

(86) PCT No.: PCT/US00/30726

§ 371 (c)(1),
(2), (4) Date: Jun. 20, 2003

(87) PCT Pub. No.: WO01/34516

PCT Pub. Date: May 17, 2001

Related U.S. Application Data

(60) Provisional application No. 60/165,269, filed on Nov. 12, 1999.

(51) Int. Cl.
*C06D 5/00* (2006.01)

(52) U.S. Cl. .................... 102/530; 102/367; 280/736; 280/741

(58) Field of Classification Search ................ 102/530, 102/367; 280/736, 741; 149/47
See application file for complete search history.

(56) References Cited

U.S. PATENT DOCUMENTS

| 3,532,359 A | 10/1970 | Teague et al. |
| 3,606,377 A | 9/1971 | Martin |
| 3,698,183 A | 10/1972 | MacDonald et al. |

(Continued)

FOREIGN PATENT DOCUMENTS

DE   4126743   2/1993

(Continued)

*Primary Examiner*—M. Clement
(74) *Attorney, Agent, or Firm*—Dean W. Russell; Kilpatrick Stockton LLP

(57) ABSTRACT

A gas generator (24; 140) may be used in an inflatable member system (20) which includes an inflatable member (22) expandable from a stowed condition to a deployed condition. The generator may include a flexible container (30; 150) within the inflatable member, a gas generant (28; 148), initially located within the flexible container, and an initiator (34). A propagating member (60; 142) may be located within the container to permit the initiator to initiate the generant upon triggering of the initiator to inflate the inflatable member from stowed to deployed conditions. A sustainer (44; 152; 156) may be provided to sustain the gas generation and may be positioned within a generator housing upstream of the propagating member or at or adjacent the downstream end of the propagating member.

34 Claims, 4 Drawing Sheets

U.S. PATENT DOCUMENTS

| | | | |
|---|---|---|---|
| 3,711,115 A | 1/1973 | Lohr | 280/150 AB |
| 3,724,870 A | 4/1973 | Kurokawa et al. | |
| 3,776,570 A | 12/1973 | Weman | |
| 3,778,084 A | 12/1973 | Sutherland et al. | 280/150 AB |
| 3,839,105 A | 10/1974 | Dewitt et al. | 149/19.4 |
| 3,928,964 A | 12/1975 | Hamilton | 60/219 |
| 3,972,545 A | 8/1976 | Kirchoff et al. | 280/735 |
| 3,977,924 A | 8/1976 | McCulloch et al. | 149/19.3 |
| 4,136,894 A | 1/1979 | Ono et al. | |
| 4,139,404 A | 2/1979 | Goddard et al. | |
| 4,164,513 A | 8/1979 | Goddard | |
| 4,200,615 A | 4/1980 | Hamilton et al. | |
| 4,315,785 A | 2/1982 | Brodman et al. | 149/19.8 |
| 4,358,327 A | 11/1982 | Reed, Jr. et al. | 149/19.4 |
| 4,722,551 A | 2/1988 | Adams | |
| 4,856,433 A | 8/1989 | Evans | 102/530 |
| 4,902,036 A | 2/1990 | Zander et al. | |
| 4,923,212 A | 5/1990 | Cuevas | |
| 4,950,458 A | 8/1990 | Cunningham | |
| 4,998,751 A * | 3/1991 | Paxton et al. | 280/741 |
| 5,007,661 A | 4/1991 | Lenzen | 280/735 |
| 5,066,039 A | 11/1991 | Masaaki et al. | |
| 5,078,422 A | 1/1992 | Hamilton et al. | |
| 5,101,729 A | 4/1992 | Noble et al. | |
| 5,125,684 A | 6/1992 | Cartwright | |
| 5,131,680 A | 7/1992 | Coultas et al. | |
| 5,219,178 A * | 6/1993 | Kobari et al. | 280/736 |
| 5,224,550 A | 7/1993 | Bragg | 169/62 |
| 5,249,824 A | 10/1993 | Swann et al. | |
| 5,273,313 A | 12/1993 | Klober et al. | |
| 5,275,433 A * | 1/1994 | Klober et al. | 280/741 |
| 5,282,648 A | 2/1994 | Peterson | |
| 5,290,060 A | 3/1994 | Smith | |
| 5,299,828 A | 4/1994 | Nakajima et al. | |
| 5,322,322 A | 6/1994 | Bark et al. | |
| 5,346,254 A | 9/1994 | Esterberg | |
| 5,358,273 A | 10/1994 | Onishi et al. | |
| 5,364,127 A | 11/1994 | Cuevas | |
| 5,397,543 A | 3/1995 | Anderson | |
| 5,403,035 A | 4/1995 | Hamilton | |
| 5,406,889 A | 4/1995 | Letendre et al. | |
| 5,415,932 A | 5/1995 | Bishop et al. | |
| 5,423,570 A | 6/1995 | Kort et al. | |
| 5,433,147 A | 7/1995 | Brede et al. | |
| 5,435,594 A | 7/1995 | Gille | |
| 5,443,286 A | 8/1995 | Cunnningham et al. | |
| 5,462,307 A | 10/1995 | Webber et al. | |
| 5,464,246 A | 11/1995 | Castro et al. | |
| 5,480,181 A | 1/1996 | Bark et al. | |
| 5,483,896 A | 1/1996 | Hock et al. | |
| 5,495,807 A | 3/1996 | Klober et al. | |
| 5,496,062 A | 3/1996 | Rink et al. | |
| 5,507,890 A | 4/1996 | Swann et al. | 149/16 |
| 5,520,413 A | 5/1996 | Mossi et al. | |
| 5,529,335 A | 6/1996 | Bohmler | 280/741 |
| 5,564,743 A | 10/1996 | Marchant | |
| 5,577,765 A | 11/1996 | Hock et al. | |
| 5,588,676 A | 12/1996 | Clark et al. | |
| 5,609,210 A * | 3/1997 | Galbraith et al. | 169/26 |
| 5,613,706 A | 3/1997 | Parker et al. | |
| 5,623,115 A | 4/1997 | Lauritzen et al. | |
| 5,630,618 A | 5/1997 | Hamilton et al. | |
| 5,660,412 A | 8/1997 | Renfroe et al. | |
| 5,670,738 A | 9/1997 | Storey et al. | |
| 5,697,636 A | 12/1997 | Orme et al. | |
| 5,709,406 A | 1/1998 | Buchanan | |
| 5,718,294 A | 2/1998 | Billiard et al. | 169/61 |
| 5,738,374 A | 4/1998 | Marsaud et al. | |
| 5,752,717 A | 5/1998 | Galbraith et al. | |
| 5,797,619 A | 8/1998 | Bauer et al. | 280/728.3 |
| 5,816,330 A | 10/1998 | Billiard et al. | 169/26 |
| 5,820,162 A | 10/1998 | Fink | |
| 5,829,779 A | 11/1998 | Nakashima et al. | |
| 5,839,754 A | 11/1998 | Schluter et al. | |
| 5,868,424 A | 2/1999 | Hamilton et al. | |
| 5,918,900 A | 7/1999 | Ennis | |
| 5,927,748 A | 7/1999 | O'Driscoll | |
| 5,934,705 A | 8/1999 | Siddiqui et al. | |
| 5,967,550 A * | 10/1999 | Shirk et al. | 280/736 |
| 5,970,880 A | 10/1999 | Perotto | |
| 6,019,389 A | 2/2000 | Burgi et al. | |
| 6,032,979 A | 3/2000 | Mossi et al. | |
| 6,062,143 A * | 5/2000 | Grace et al. | 102/530 |
| 6,066,017 A | 5/2000 | Max et al. | |
| 6,073,961 A | 6/2000 | Bailey et al. | |
| 6,079,740 A | 6/2000 | Barth et al. | |
| 6,095,559 A * | 8/2000 | Smith et al. | 280/741 |
| 6,106,010 A | 8/2000 | Forbes et al. | |
| 6,119,474 A | 9/2000 | Augustine et al. | |
| 6,123,790 A * | 9/2000 | Lundstrom et al. | 149/47 |
| 6,177,028 B1 | 1/2001 | Kanda et al. | |
| 6,227,562 B1 | 5/2001 | Shirk et al. | |
| 6,237,941 B1 | 5/2001 | Bailey et al. | |
| 6,237,950 B1 | 5/2001 | Cook et al. | |
| 6,253,683 B1 | 7/2001 | Fukabori | |
| 6,308,984 B1 | 10/2001 | Fisher | |
| 6,422,599 B2 | 7/2002 | Oehm | |
| 6,460,873 B1 | 10/2002 | Lebaudy et al. | |
| 6,612,243 B1* | 9/2003 | Italiane et al. | 102/367 |
| 6,702,320 B1 | 3/2004 | Lang et al. | |
| 6,746,046 B2 | 6/2004 | Rink et al. | |
| 6,755,438 B2 | 6/2004 | Rink et al. | |
| 6,820,898 B2 | 11/2004 | Dinsdale et al. | |
| 6,854,764 B2 | 2/2005 | Larsen et al. | |
| 6,886,469 B2* | 5/2005 | Shilliday et al. | 102/530 |
| 2003/0075904 A1 | 4/2003 | Lebaudy et al. | |
| 2003/0075909 A1* | 4/2003 | Lebaudy et al. | 280/741 |
| 2003/0213398 A1 | 11/2003 | Shilliday et al. | |

FOREIGN PATENT DOCUMENTS

| | | |
|---|---|---|
| DE | 4134995 | 3/1993 |
| DE | 42 11 672 | 10/1993 |
| DE | 200 13 405 | 2/2001 |
| EP | 0480085 | 4/1992 |
| EP | 00888932 | 1/1999 |
| EP | 1069005 | 1/2001 |
| GB | 2303479 A | 2/1997 |
| JP | 49-15082 | 4/1974 |
| JP | 49-120332 | 11/1974 |
| JP | 01-151066 | 6/1989 |
| JP | 1-269640 | 10/1989 |
| JP | 1-273748 | 11/1989 |
| JP | 2-81747 | 3/1990 |
| JP | 6-24287 | 2/1994 |
| JP | 8-156724 | 6/1996 |
| JP | 8-198050 | 8/1996 |
| JP | 9-30367 | 2/1997 |
| JP | 9-100192 | 4/1997 |
| JP | 9-124389 | 5/1997 |
| WO | WO 94/01307 | 1/1994 |
| WO | WO 94/14637 | 7/1994 |
| WO | WO 96/40541 * | 12/1996 |
| WO | WO 97/20786 | 6/1997 |
| WO | WO99/38725 | 8/1999 |
| WO | WO 00/57959 | 10/2000 |
| WO | WO 01/12475 | 2/2001 |
| WO | WO 03/097382 A2 | 11/2003 |
| WO | WO 2004/110825 A1 | 12/2004 |

* cited by examiner

U S 7,188,567 B1

GAS GENERATION SYSTEM

CROSS-REFERENCE TO RELATED APPLICATION

This patent application is the U.S. national phase of PCT/US00/30726 entitled "Gas Generation System" that was filed on Nov. 10, 2000 and published in English on May 17, 2001 and claims priority of U.S. Provisional Patent Application Ser. No. 60/165,269 entitled "Gas Generation System" filed on Nov. 12, 1999, the disclosure of which is incorporated by reference herein as if set forth at length.

BACKGROUND OF THE INVENTION (1) Field of the Invention

This invention relates to gas generation, and more particularly to gas generation systems useful for inflation purposes.

(2) Description of the Related Art

Rapid deflagrating cord (RDC), sometimes erroneously identified as rapid detonating cord has been in common use in the explosives industry as a transfer line for igniting explosives. Detonating cord (detcord) has been used extensively as a transfer line and as an explosive (e.g., for cutting structural elements). Both RDC and detcord comprise a sheath containing an explosive (commonly identified as a "pyrotechnic" in the case of RDC). Detcord typically comprises a plastic or cloth sleeve containing a high explosive charge. When ignited at one end, detcord burns via propagation of a detonating shock wave. The shock wave moves through the explosive at a velocity greater than the speed of sound in the explosive (nearly always in excess of about 2000 ml/s and typically 5000–7000 m/s) and ignites the unreacted explosive through which it passes. With RDC, burning is via deflagration, a high velocity subsonic propagation (typically less than 2000 m/s). With RDC, thermal energy is transferred from the reacted explosive to the unreacted explosive primarily via conduction. With detcord and RDC, the combustion involves self-contained oxygen in the explosive charge.

RDC has been used as a component in gas generators. RDC can typically be ignited via the output of a conventional automotive airbag initiator (e.g., one containing a charge of 35 mg zirconium potassium perchlorate (ZPP) or its equivalent). The output of such an initiator is not reliably capable of directly igniting detcord. Detcord requires a detonator to provide the initial energy necessary to induce ignition of the detcord.

U.S. Pat. No. 6,062,143 of Grace et al. identifies a distributed charge inflator (DCI). The application identifies use of an electronic squib (commonly used in automotive airbag inflators) to ignite a core of ignition material such as RDC or mild detonating fuse (MDF). The presence of a gas-generating layer or coating on the core is also identified.

U.S. Pat. No. 5,967,550 of Shirk et al. identifies a staged pyrotechnic air bag inflator. A housing defines a chamber with an end-burning pyrotechnic charge The charge has a first predetermined burn rate at a first location along the length of the chamber and a different second predetermined burn rate at a second location along the length of the chamber spaced apart from the first location. The second burn rate may be effective to maintain inflation of the air bag over a desired interval.

BRIEF SUMMARY OF THE INVENTION

We have identified a need for an gas generation system (e.g., one useful for inflation) wherein an initial gas generation is followed by a sustaining gas generation. In an inflatable member system such as an automotive airbag system, the initial gas generation is effective to inflate/deploy the airbag while the sustaining gas generation is effective to maintain the airbag in a deployed condition over a time interval advantageous for providing occupant protection.

Accordingly, in one aspect the invention is directed to an inflatable member system with a gas generant initially located within the inflatable member. A gas generator housing has an initiator mounted at an upstream end and a sustainer gas generant initially positioned within the housing. The initiator is positioned to, upon triggering, cause ignition of the gas generant so that the generant combusts over a first time interval so as to generate inflation gas in a sufficient amount to substantially inflate the inflatable member from stowed to deployed conditions. The initiator is also positioned to, upon triggering, cause ignition of the sustainer gas generant so that the sustainer gas generant combusts over a second time interval. The second time interval ends after the end of the first time interval so as to generate sustainer gas in a sufficient amount to substantially maintain the inflatable member in the deployed condition.

In various implementations of the invention, the first interval may have a length of less than 0.030 seconds and the second interval may have a length of at least 0.150 seconds. The system may include a flexible container within the inflatable member with the gas generant initially located within the flexible container. There may be a conduit at least partially within the flexible container and having a sidewall extending from a proximal end proximate the initiator to a distal end. The conduit may separate a conduit interior from a conduit exterior and the sidewall may have a plurality of apertures. The gas generant may be located substantially external to the conduit. The initiator may be positioned to, upon triggering, cause a flame from to migrate from the proximal end toward the distal end. The apertures may be positioned and have sufficient size to permit the flame front to communicate through each aperture from the conduit interior to the conduit exterior so as to ignite a portion of the gas generant proximate such aperture and cause a distributed ignition of the gas generant to generate the gas. Advantageously, instead of the conduit, the system may include an ignition cord extending from a proximal end coupled to the housing downstream end and containing a charge. The initiator maybe positioned to, upon triggering, cause ignition of the ignition cord which in turn causes combustion of the gas generant which in turn causes the inflatable member to inflate.

The gas generant may include comparatively large particles of a coolant compound intermixed with a finely divided powdered fuel/oxidizer solid propellant composite in order to effect lower bulk average gas temperatures. The coolant may effective absorb heat by a process selected by the group consisting of endothermic phase transition and decomposition. The coolant may be selected from the group consisting of magnesium carbonate, magnesite, aluminum hydroxide, magnesium hydroxide, hydroxides of lanthanide elements, boric acid, carbonates of the alkali metal elements and carbonates of the alkaline earth elements. The mass of the coolant may advantageously be from 5% to 200%, of the mass of the propellant composite. The gas generant may contain, by weight, about 50% of granular magnesium carbonate and 50% of the propellant composite. The propellant composite may burn rapidly at ambient pressure conditions.

In another aspect, the invention is directed to an inflatable member system having a flexible container within the inflatable member, a gas generant initially within the flexible container, and an initiator. An elongate ignition propagating member extends at least partially within the flexible container from a proximal end to a distal end. The gas generant is located external to the propagating member. The initiator is positioned to, upon triggering, cause a flame front to migrate from the proximal end toward the distal end. The inflation gas generated by combustion of the gas generant is a sufficient amount to substantially inflate the inflatable member from stowed to deployed conditions.

In various implementations of the invention, the propagating member may comprise a conduit having a sidewall extending from the proximal end proximate the initiator to the distal end and separating a conduit interior from a conduit exterior. The sidewall may have a plurality of apertures. The apertures may be positioned to and have sufficient size to permit the flame front to communicate through each aperture from the conduit interior to the conduit exterior so as to ignite a portion of the gas generant proximate such aperture and cause a distributed ignition of said gas generant to generate inflation gas. The conduit may be elastically or inelastically flexible or may be otherwise formable into a desired shape. The flexible container may comprise at least one layer of polymer film. The gas generant has a burn rate effective to combust during a first time interval upon ignition. The migration of the flame front may define a downstream direction and a sustainer generant may initially be positioned within the conduit or upstream thereof. The sustainer gas generant may have a burn rate effective to combust during a second time interval upon ignition. The second time interval may be longer than the first time interval and extend beyond the first time interval so that combustion of the sustainer gas generant maintains the inflatable member in the deployed condition after the end of the first interval. The system may include a housing having upstream and downstream ends and an interior space. The initiator may be mounted in the upstream housing end and the conduit proximal end may be mounted in the downstream housing end. The sustainer gas generant may initially be positioned within the housing. The sustainer gas generant may initially be positioned on a lateral interior surface of the housing surrounding a space between the initiator and the conduit. The sustainer gas generant may be located in a distal portion of the conduit. The ignition propagating member may comprise an ignition cord having a charge within a sheath. The sustainer gas generant may initially be positioned within a distal end portion of the flexible container or upstream thereof.

In other aspects, the invention is directed to method for deploying an inflatable member. In yet other aspects, the invention is directed to a gas generator not necessarily used for inflation.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
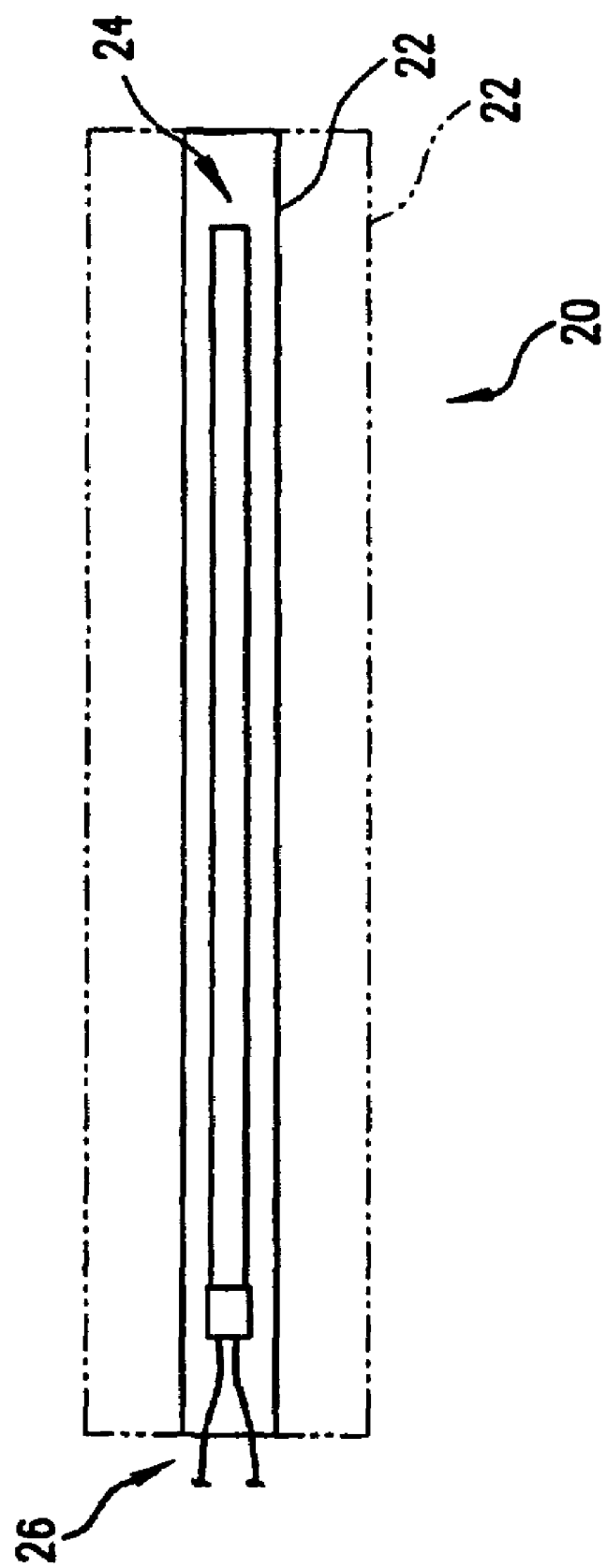
FIG. 1 is a schematic cross-sectional view of an inflatable member system including a gas generator.

FIG. 1 shows a system 20 including an inflatable member 22 and a gas generator 24 for generating the gas necessary to inflate the inflatable member. The inflatable member is inflatable from a relatively compact, low internal volume, stowed condition shown in solid lines to a relatively high internal volume deployed condition shown in broken lines. The inflatable member may take any appropriate form such as an expandable metal bladder, an elastic bladder, or a flexible member such as a fabric bag, which, in its stowed condition, may be folded. In the exemplary embodiment, the gas generator is located internal to the inflatable member and is controlled by a pair of leads 26 extending from without to within the inflatable member and connected to an appropriate control system.

Figure 2:
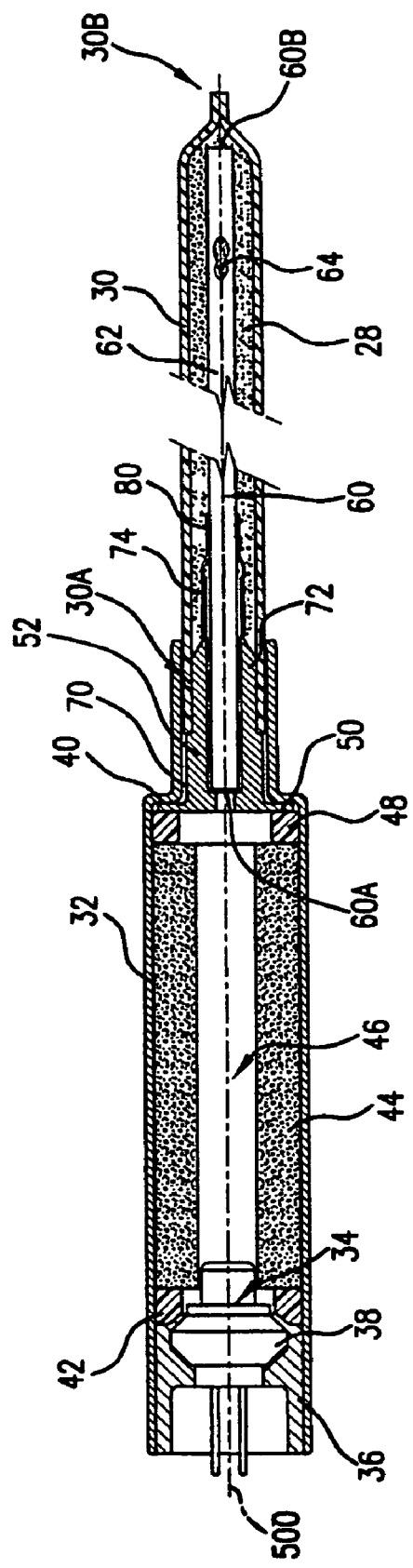
FIG. 2 is a partial semi-schematic cross-sectional view of the gas generator of FIG. 1.

In the exemplary embodiment of FIG. 2, the generator includes a primary gas generating propellant 28 contained within an elongate flexible member 30 such as a polymeric or metallic tube. The tube 30 has an upstream or proximal end 30A coupled to a downstream end of an initiator housing body 32 and extends to a closed downstream or distal end 30B. An exemplary tube is formed of a plastic such as crosslinked polyethylene, its downstream end closed via a pinch and heat seal operation. The generator has a centerline 500 along which the downstream direction is defined from the housing body 32 toward the tube distal end 30B. At its upstream end, the housing body 32 carries an initiator 34 by means of an initiator housing end plug 36. In the exemplary embodiment of a disposable gas generator 24, the body 32 and end plug 36 are formed of stainless steel. A flange portion 38 of the initiator 34 is crimped within a downstream compartment in the end plug. An exterior cylindrical surface of the end plug is received by and contacts an interior cylindrical surface of the body 32. The end plug may be secured to the body such as by welding along aligned upstream rims of the two. Stainless steel for the housing is preferred due to its strength and corrosion resistance. Stainless steel is preferred for the plug due to corrosion resistance and weld compatibility with the housing. Alternatively, an aluminum plug may be crimped or otherwise secured to the housing.

A downstream end portion (neck) of the exemplary housing body is of reduced diameter relative to the upstream portion and separated therefrom by an annular radially-extending flange forming a shoulder 40. From upstream to downstream sandwiched between a downstream surface of the end plug 36 and the shoulder 40 are: an upstream annular elastomeric foam ring 42; an annular tube 44 of sustainer propellant having a central longitudinal channel or aperture 46; a downstream annular elastomeric foam ring 48; and an upstream radially-extending flange 50 of a ferrule 52. The rings 42 and 48 serve as pads, holding and supporting the sustainer 44 under slight longitudinal compression. As an alternative to the rings, other compliant or compressible means may be used such as steel wool, belleville washers, coil springs, and the like. Exemplary sustainer generant is preferably formed by extrusion and cut to length forming upstream and downstream annular ends of the sustainer. The sustainer composition should be easy to ignite at low pressure (14.7 to 100 psia (0.10 to 0.69 MPa)) and exhibit a relatively low pressure exponent (<0.7). Examples of suitable propellants include an ammonium perchlorate/potassium nitrate type composition (AP/KN) formulations and air bag propellant formulations that have been modified with a suitable burn rate catalyst. Certain potentially useful propellants including a powder fuel, a powder oxidizer, and a powder coolant such as disclosed in the U.S. Pat. No. 5,609,210 of Galbraith et al., the disclosure of which is incorporated herein by reference as if set forth at length. Such propellant/generant may also be useful as the primary gas generating propellant. Other potentially useful propellants are disclosed in U.S. Pat. No. 6,123,790 of Lundstrom et al., the disclosure of which is incorporated by reference herein as if set forth at length. Another alternative combination involves a loose nitrocellulose as the primary gas generating propellant with a compacted cellulose/nitrocellulose composite as the sustainer. A preferred sustainer should exhibit relatively long burn times (e.g., 0.15 or 0.25 to 5 seconds) at pressure ranging from 14.7 psia to 200 psia (0.10 MPa to 1.4 MPa).

In the illustrated embodiment, an operative end or charge cup portion of the initiator extends slightly within an upstream end portion of the sustainer. An exemplary initiator may take the form of a squib having a general construction commonly utilized in automotive airbag applications. Within a plastic body, the squib contains a small explosive charge (not shown) and has electrical leads for connecting the charge to an external control circuit via the leads 26. When an appropriate voltage is applied to the leads, the charge is ignited. Examples of such initiators are the LCI initiator of Quantic Industries, Inc. of San Carlos, Calif. and products of Special Devices, Inc. of Newhall. Calif. If required, a more robust initiator having a threaded metal body (e.g., manufactured according to United States Military Standard 1-23659) may be used.

Concentrically within the tube is carried an ignition propagating member 60 extending from an upstream end 60A to a downstream end 60B. An exemplary propagating member is rapid deflagrating cord having a sheath 62 and a pyrotechnic or an explosive 64 contained within the sheath. In the exemplary embodiment, the cord upstream/proximal end 60A is located near but slightly downstream of the downstream end of the sustainer. The cord is thus spaced significantly apart from the initiator charge cup. Advantageously, the initiator charge is effective to initiate combustion of the propagating member and of the sustainer. This may require the presence of a relatively large initiator charge or the addition of a transfer charge to transfer output of the initiator to the propagating member. This need can be reduced somewhat by extending the propagating member through the sustainer into close proximity with the initiator. However such a configuration may cause damage to the sustainer from the combustion of the propagating member.

The upstream cord end 60A is received by and held within a counterbored central aperture in the ferrule 52. A first portion 70 of the ferrule extends forward from the flange 50 largely within the downstream neck portion of the housing. The diameter of the portion 70 advantageously provides a slight clearance between its outer surface and the inner surface of the housing neck. A more downstream second ferrule portion 72 has a further reduced diameter. The portion 72 is surrounded by an upstream end portion of the tube. The tube wall thickness is advantageously greater than the difference between the external radii of the portions 70 and 72, permitting the tube to be compressed between the inner surface of the neck and the outer surface of the portion 72. A third ferrule portion 74 further downstream and of substantially reduced diameter is separated from the portion 72 by a bevel approximately coaligned with the downstream rim of the housing. The bevel allows the housing to be crimped radially inward at the rim, providing robust engagement between the housing and the tube. The portion 74 extends to a downstream rim of the ferrule and is surrounded by a length of heat shrink tubing 80 extending forward therefrom and surrounding an adjacent portion of the propagating member. The tubing 80 provides a seal between the annular propellant-carrying space between the tube and propagating member on the one hand and the interior of the housing on the other. Since, in the illustrated embodiment, the ferrule is totally sealed within the housing and tube, environmental exposure is less of a concern. Accordingly, it may be formed of a carbon steel instead of stainless steel or another more corrosion resistant metal.

Advantageously, the tube 30 and propagating member/cord 60 are highly flexible, permitting them to conform to a desired shape within the interior of the inflatable member in the stowed condition. Depending upon the application, their lengths may be from a few centimeters to several meters. In automotive airbag inflation applications, lengths from approximately 10 cm to approximately 2 m are anticipated. The diameter of the tube will typically be an extremely small fraction of its length (e.g., about 0.9 cm, with approximately 0.5–2.0 cm likely to cover most applications).

Upon triggering of the initiator, the explosion of the initiator's charge ignites the upstream cord end 60A. This in turn, causes deflagration of the explosive 64 propagating from the upstream end 60A to the downstream end 60B. The deflagrating explosive 64 may combust the sheath 62 or may be vented through apertures (not shown) in the sheath. As the deflagrating front moves along the cord 60 within the tube 30, it induces local ignition of the primary generant 28 located in the annular space between the outer surface of the sheath 62 and the inner surface of the tube 30. Combustion of the primary generant 28 generates a high volume of gas which ruptures the tube 30 and inflates the inflatable member 22 from stowed to deployed conditions. The primary generant 28 will typically combust over a relatively short time interval. To maintain inflation of the inflatable member, the sustainer is provided to combust over a relatively longer interval. The gas generated from combustion of the sustainer may be vented from the housing through the ferrule or through initially sealed apertures (not shown).

The length of the time intervals over which the primary generant and the sustainer generant are combusted may be selected for the particular application. The beginning of the latter interval may also be delayed relative to the beginning of the former. Additionally, the total amount of gas generated by respective combustion of the primary and sustainer generants may be tailored to the particular application. By way of example, in an automotive passenger restraint application: the first (inflation) interval may have a length of about 8–20 ms: the second (sustaining) interval may have a length of about 0.25–7.0 seconds and its beginning may not necessarily be offset from the beginning of the first interval; and the molar amount of gas produced by combustion of the sustainer generant may be approximately one to ten times that produced by combustion of the primary generant (with a negligible to small contribution from the combustion of the cord 50). The selection of the absolute and relative amounts of gas to be generated by the primary and sustainer generants as well as the required intervals are expected to be optimized for any particular use, based upon the myriad of factors presented by the particular use and by the particular construction of inflatable member.

Figure 3:
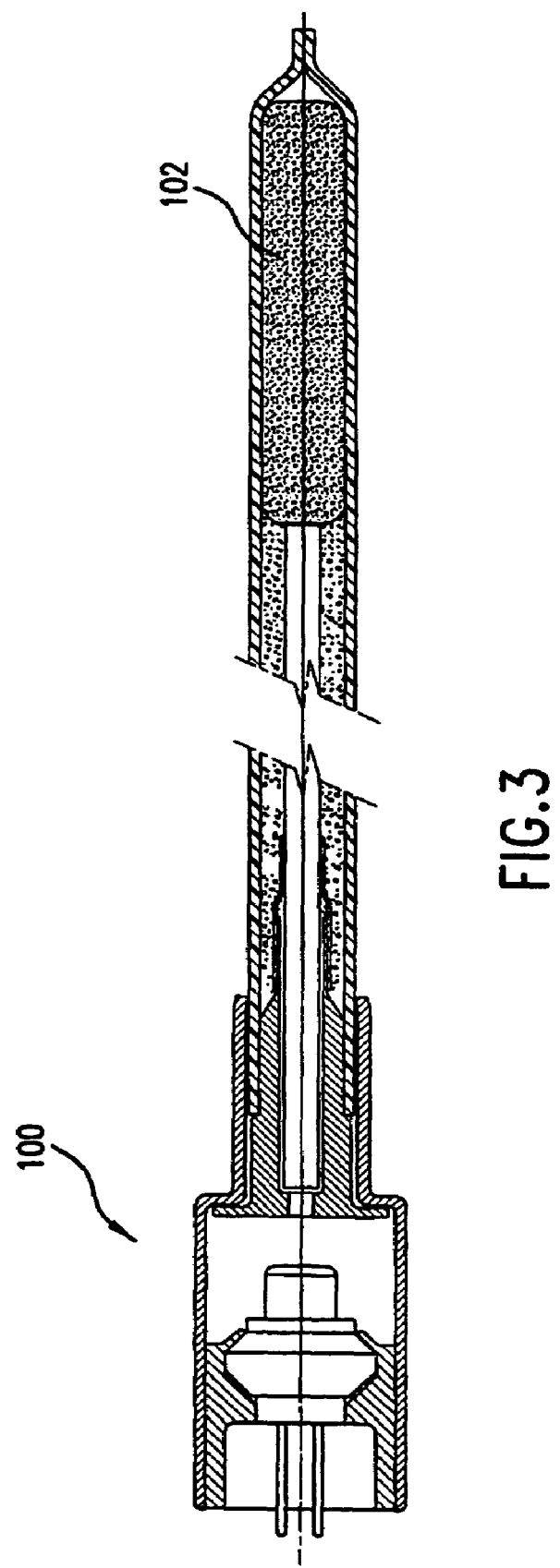
FIG. 3 is a partial semi-schematic cross-sectional view of an alternate gas generator.

FIG. 3 shows an alternate embodiment 100 of a gas generator in large part similar or identical to the generator 24 of FIG. 2. A key difference is that the illustrated generator 100 omits the sustainer within the housing, as well as the associated volume of housing, and the sustainer support rings. Also, the initiator may be of reduced charge as the initiator charge cup may be in relative close facing proximity to the upstream propagation member end. A further difference is the location of a sustainer 102 in a distal (downstream) portion of the tube. In the illustrated embodiment, the sustainer 102 is formed approximately as a cylinder (e.g., pressed, molded, or extruded) having an upstream end proximate a downstream end of the propagation member and a downstream end proximate the downstream end of the tube. In the generator 100, the sustainer 102 may be ignited by the propagating member and/or the main propellant, rather than directly by the initiator. Advantageously, the tube is provided with sufficient robustness so that its rupturing via the combustion of the propagating member and main propellant does not sever a distal portion of the tube from a proximal portion which remains attached to the housing. Advantageously, longitudinally-extending ruptures permit venting of the combustion gasses while retaining the sustainer sufficiently to allow the sustainer to be ignited and combust over the sustaining interval. The tube may also be provided with preferential rupture zones such as reduced-thickness relieved areas.

Figure 4:
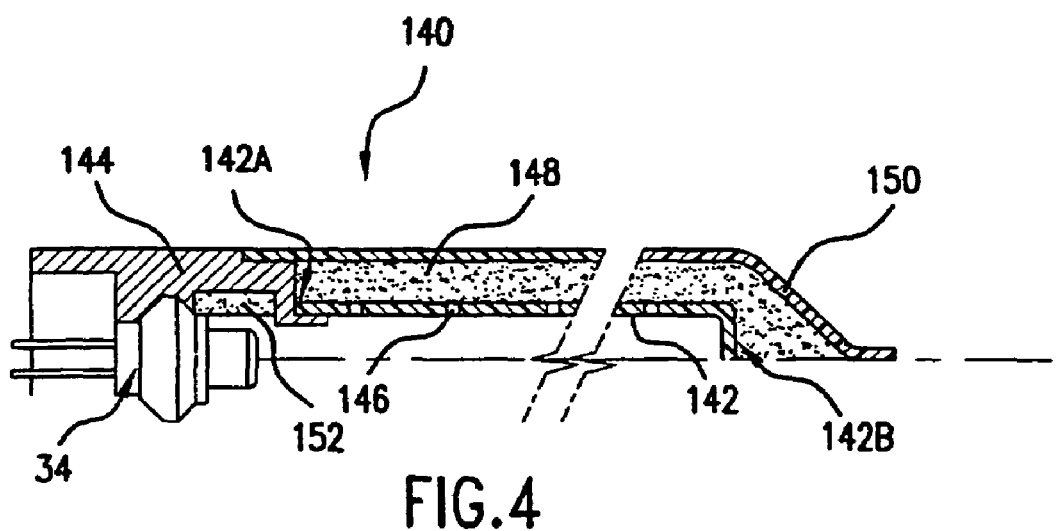
FIG. 4 is a partial semi-schematic cross-sectional view of an alternate gas generator.

FIG. 4 shows a gas generator 140 featuring a flash tube 142 as a propagating member. The flash tube 142 has an open proximal end 142A connected to the initiator housing 144 and a closed distal end 142B. A plurality of apertures 146 are located along the length of the tube 142. These apertures may be initially sealed, such as by a film layer, or may initially extend only partially through the thickness of the tube 142. In operation, the flame output of the initiator may proceed down the tube 142, passing through the apertures 146 (and rupturing any film or other blockage of the apertures). The primary generant 148 is thereby ignited, rupturing the container 150, and inflating the inflatable member (not shown). When compared with direct ignition of the primary generant by a squib, use of a flash tube helps to improve simultaneity of ignition throughout the generant and protects the inflatable member from direct contact with the explosive output of the initiator.

Figure 5:
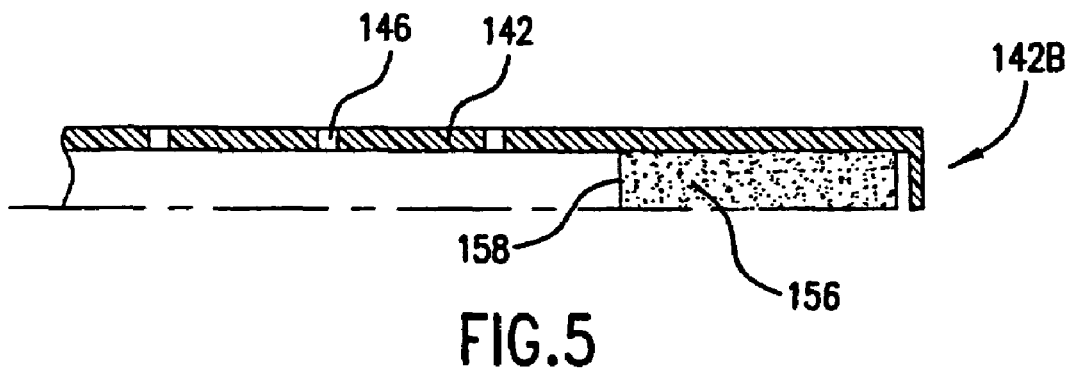
FIG. 5 is a partial semi-schematic cross-sectional view of a flash tube useful in the gas generator of FIG. 4.

A sustainer generant 152 may be located within the housing 144. Alternatively, or in addition, a sustainer generant may be located within the tube, namely at the distal end 142B. FIG. 5 shows such a sustainer generant 156. The sustainer generant 156 presents a relatively small upstream surface 158 to the initial flame within the flash tube. Such flame ignites the generant 156 which then combusts from upstream to downstream over the desired sustaining interval.

Figure 6:
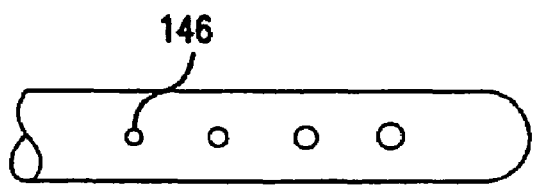
FIG. 6 is a partial semi-schematic view of a flash tube useful in the gas generator of FIG. 4.

The size and spacing of the apertures 146 may be varied along the length of the flash tube 142 to achieve a desired inflation profile. For example, as shown in FIG. 6 the apertures may be made progressively larger from the proximal end to the distal end of the flash tube. This may be advantageous for reasons which may include controlling shock imparted to the surrounding inflatable member.

Figure 7:
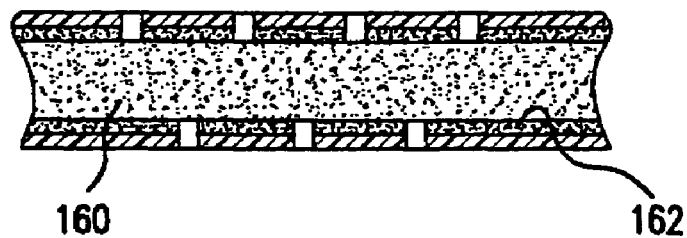
FIG. 7 is a partial semi-schematic cross-sectional view of a flash tube useful in the gas generator of FIG. 4.

If the output of the initiator 34 is insufficient to ignite the primary generant (this will very likely be the case with a relatively long flash tube) the initiator output may be augmented by locating a small amount of explosive material within the initiator housing or within the flash tube. For example, as shown in FIG. 7, supplemental material 160 may loosely fill the tube and/or supplemental material 162 may be provided as a coating on the inner surface of the tube. An exemplary supplemental material is boron potassium nitrate ($BKNO_3$).

In certain applications, a rebuildable/reusable gas generator may be more desirable than a disposable one. One such possible embodiment (not shown) sandwiches the initiator flange between upstream and downstream pieces of the end plug. The upstream plug piece may have an externally threaded outer surface engaged to an internally threaded mouth surface of the housing body.

Other sustainer configurations are possible. For example, the sustainer may be formed a as a coating on the interior surface of the housing. As an alternative to a single extruded-to-length sustainer piece or "grain", the sustainer may be formed of multiple pieces. For example, the sustainer may be formed as a stack of compressed, molded, or extruded, centrally apertured, sustainer disks. The number of disks, and thus the length of the stack, would be selected as appropriate for the intended application.

In other alternate embodiments of a gas generator (not shown) the propagating member may be formed by a length of detcord, the upstream end of which is held by the initiator housing. The output of the initiator may not be capable of directly igniting the explosive charge (e.g., PETN or a PETN/RDX mixture) of the detcord. In this case intervening high explosive transfer charge may be provided. The transfer charge is ignited by the output of the initiator and in turn is effective to ignite the detcord. The use of detcord may present cost advantages relative to use of RDC or other material. The speed of explosive propagation of detcord may provide a high degree of simultaneity of ignition in a body of generant dispersed along the detcord.

One or more embodiments of the present invention have been described. Nevertheless, it will be understood that various modifications may be made without departing from the spirit and scope of the invention. For example, various forms and compositions of primary and sustainer generants may be utilized. Pellets and disks of compacted, molded, or extruded generants are desirable for the sustainer generant as are single grain forms due to the reduced combustion rate. Additionally, many of the details of the generator may be optimized for the particular inflation or other application with which it is intended to be used. Accordingly, other embodiments are within the scope of the following claims.

What is claimed is:

1. An inflatable member system, comprising:
   an inflatable member expandable from a stowed condition to a deployed condition;
   a gas generant, initially located within the inflatable member; and
   an initiator;
   a housing having upstream and downstream ends and an interior space and wherein the initiator is mounted in the upstream housing end; and
   a sustainer gas generant initially positioned within the housing;

wherein:

the initiator is positioned to, upon triggering, cause ignition of the gas generant so that the gas generant combusts over a first time interval so as to generate inflation gas in a sufficient amount to substantially fully inflate the inflatable member from the stowed condition to the deployed condition in which the inflatable member contains a first volume of inflation gas; and the initiator is positioned to, upon triggering, cause ignition of the sustainer gas generant so that the sustainer gas generant combusts over a second time interval, ending after an end of the first time interval, so as to generate sustainer gas in a sufficient amount to substantially maintain the inflatable member in the deployed condition containing approximately the first volume of inflation gas.

2. The inflatable member system of claim 1 wherein:
the first interval has a length of less than 0.030 seconds;
the second interval has a length of at least 0.150 seconds.

3. The inflatable member system of claim 1 further comprising:

a flexible container within the inflatable member, wherein the gas generant is initially located within the flexible container; and a conduit at least partially within the flexible container, the conduit having a sidewall extending from a proximal end proximate the initiator to a distal end and separating a conduit interior from a conduit exterior, the sidewall having a plurality of apertures and the gas generant located substantially external to the conduit;

wherein:

the initiator is positioned to, upon triggering, cause a flame front to migrate from the proximal end toward the distal end;

the plurality of apertures are positioned and have sufficient size to permit the flame front to communicate through each aperture from the conduit interior to the conduit exterior so as to ignite a portion of the gas generant proximate such aperture and cause a distributed ignition of said gas generant to generate the gas.

4. The inflatable member system of claim 1 further comprising an ignition cord extending from a proximal end coupled to the housing downstream end to a distal end and containing a charge and wherein the initiator is positioned to, upon triggering, cause ignition of the ignition cord which in turn causes combustion of the gas generant which in turn causes the inflatable member to inflate from the stowed condition to the deployed condition.

5. The inflatable member system of claim 1 wherein said gas generant includes comparatively large particles of a coolant compound intermixed with a finely divided powdered fuel/oxidizer solid propellant composite in order to effect lower bulk average gas temperatures.

6. The inflatable member system of claim 5 wherein said coolant effectively absorbs heat by a process selected from the group consisting of endothermic phase transition and decomposition.

7. The inflatable member system of claim 6 wherein said coolant is selected from the group consisting of magnesium carbonate, magnesite, aluminum hydroxide, magnesium hydroxide, hydroxides of lanthanide elements, boric acid, carbonates of the alkali metal elements and carbonates of the alkaline earth elements.

8. The inflatable member system of claim 7 wherein said coolant is magnesium carbonate.

9. The inflatable member system of claim 7 wherein the mass of said coolant is from 5% to 200%, by weight, of the mass of the propellant composite.

10. The inflatable member system of claim 9 wherein said gas generant contains, by weight, about 50% of granular magnesium carbonate and 50% of said propellant composite.

11. The inflatable member system of claim 10 wherein said propellant composite burns rapidly at ambient pressure conditions.

12. A method for deploying an inflatable member (22) from a stowed condition to a deployed condition, comprising:

providing a gas generant (148), initially located within a flexible container within the inflatable member; and providing an initiator (34);

providing a conduit (142) at least partially within the flexible container, the conduit having a sidewall extending from a proximal end proximate the initiator to a distal end and separating a conduit interior from a conduit exterior, the sidewall having a plurality of apertures (146) and the gas generant substantially external to the conduit;

triggering the initiator to cause a flame front to migrate from the proximal end toward the distal end;

permitting the flame front to communicate through each aperture from the conduit interior to the conduit exterior so as to ignite a portion of the gas generant proximate such aperture and cause a distributed ignition of said gas generant to generate gas;

permitting the generated gas to substantially inflate the inflatable member from the stowed condition the deployed condition.

13. The method of claim 12 wherein the gas generant substantially combusts over a first time interval and the method further comprises:

providing a sustainer gas generant (152; 156), initially positioned within the conduit or upstream thereof, the sustainer gas generant having a burn rate effective to combust during a second time interval upon ignition, the second time interval being longer than the first time interval and extending beyond the first time interval so that combustion of the sustainer gas generant maintains the inflatable member in the deployed condition after the end of the first interval.

14. A gas generator comprising:

an initiator;

a housing having upstream and downstream ends and an interior space and wherein the initiator is mounted in the upstream housing end;

a gas generant, a major portion of which is located external to the housing; and a sustainer gas generant initially positioned within the housing;

wherein:

the initiator is positioned to, upon triggering, cause ignition of the gas generant so that the gas generant combusts over a first time interval so as to generate a first gas; and the initiator is positioned to, upon triggering, cause ignition of the sustainer gas generant so that the sustainer gas generant combusts over a second time interval, ending after an end of the first time interval, so as to generate sustainer gas in a sufficient amount to substantially maintain the inflatable member in the deployed condition.

15. The gas generator of claim 14 wherein:
the first interval has a length of less than 0.030 seconds; and
the second interval has a length of at least 0.150 seconds.

16. The gas generator of claim 14 wherein the sustainer gas generant is formed as at least one annulus positioned coaxially with the initiator.

17. The gas generator of claim 16 wherein the sustainer gas generant comprises a single extruded sustainer tube.

18. The gas generator of claim 14 further comprising an ignition propagating member extending from an upstream end within the housing to a downstream end external to the housing and wherein the sustainer gas generant is formed as at least one annulus having a common centerline with the ignition propagating member.

19. The gas generator of claim 18 wherein the propagating member is a rapid deflagrating cord having a sheath and a pyrotechnic charge contained within the sheath.

20. The gas generator of claim 19 further comprising a tube containing the gas generant and having a proximal end secured to the housing.

21. An inflatable member systems, comprising:
an inflatable member expandable from a stowed condition to a deployed condition;
a flexible container within the inflatable member;
a gas generant, initially located within the flexible container; and
an initiator;
characterized in that:
an elongate ignition propagating member, at least partially within the flexible container, extends from a proximal end to a distal end of the flexible container;
the gas generant is located external to the ignition propagating member;
the initiator is positioned to, upon triggering, cause a flame front to migrate from the proximal end toward the distal end; and
the inflation gas generated by combustion of the gas generant is of sufficient amount to substantially inflate the inflatable member from the stowed condition to the deployed condition.

22. The inflatable member system of claim 21 wherein:
the ignition propagating member (142) comprises a conduit having a sidewall extending from the proximal end proximate the initiator to the distal end and separating a conduit interior from a conduit exterior, the sidewall having a plurality of apertures (146); and
the plurality of apertures are positioned and have sufficient size to permit the flame front to communicate through each aperture from the conduit interior to the conduit exterior so as to ignite a portion of the gas generant proximate such aperture and cause a distributed ignition of said gas generant to generate inflation gas.

23. The inflatable member system of claim 22 wherein said conduit is at least one of flexible and formable.

24. The inflatable member system of claim 22 wherein said flexible container comprises at least one layer of polymer film.

25. The inflatable member system of claim 22 wherein:
said gas generant has a burn rate effective to combust during a first time interval upon ignition;
the migration of the flame front defines a downstream direction;
a sustainer gas generant (152; 156) is initially positioned within the conduit or upstream thereof, the sustainer gas generant having a burn rate effective to combust during a second time interval upon ignition, the second time interval being longer than the first time interval and extending beyond the first time interval so that combustion of the sustainer gas generant maintains the inflatable member in the deployed condition after the end of the first interval.

26. The inflatable member system of claim 25 further comprising:
a housing (144) having upstream and downstream ends and an interior space and wherein the initiator (34) is mounted in the upstream housing end and the conduit proximal end is mounted in the downstream housing end and wherein the sustainer gas generant (152) is initially positioned within the housing.

27. The inflatable member system of claim 26 wherein the sustainer gas generant (152) is initially positioned on a lateral interior surface of the housing (144) surrounding a space between the initiator and the conduit.

28. The inflatable member system of claim 25 wherein the sustainer gas generant (156) is located in a distal end portion of the conduit.

29. The inflatable member system of claim 25 wherein the sustainer gas generant generates an amount of gas one to ten times the molar amount of inflation gas.

30. The inflatable member system of claim 21 wherein the ignition propagating member comprises an ignition cord having a charge within a sheathe.

31. The inflatable member system of claim 30 further characterized by a sustainer gas generant initially positioned within the distal end portion of the flexible container or upstream thereof, the sustainer gas generant having a burn rate effective to combust during a second time interval upon ignition, the second time interval being longer than the first time interval and extending beyond the first time interval so that combustion of the sustainer gas generant maintains the inflatable member in the deployed condition after the end of the first interval.

32. A gas generating system, comprising:
a flexible container (150);
a gas generant (148), initially located within the flexible container; and
an initiator (34);
characterized in that:
a conduit (142) is at least partially within the flexible container, the conduit having a sidewall extending from a proximal end (142A) proximate the initiator to a distal end (142B) and separating a conduit interior from a conduit exterior, the sidewall has a plurality of apertures (146) and the gas generant is located substantially external to the conduit;
the initiator is positioned to, upon triggering, cause a flame front to migrate from the proximal end toward the distal end; and the plurality of apertures are positioned and having sufficient size to permit the flame front to communicate through each aperture from the conduit interior to the conduit exterior so as to ignite a portion of the gas generant proximate such aperture and cause a distributed ignition of said gas generant to generate gas.

33. An inflatable member system comprising:
a. an inflatable member expandable by gas to a substantially fully-inflated volume V;
b. means, comprising a primary gas generant initially located within the inflatable member, for rapidly inflating the inflatable member to volume V;
c. means, comprising a sustainer gas generant, for sustaining inflation of the inflatable member at substantially volume V for a period of time longer than is sustainable through use of the primary gas generant alone; and d. means for igniting the primary gas generant and the sustainer gas generant.

34. An inflatable member system comprising:

a. an inflatable member expandable by gas to a substantially fully-inflated volume V;
b. a primary gas generant initially located within the inflatable member, for rapidly inflating the inflatable member to volume V;
c. an elongated flexible member (i) containing the primary gas generant and (ii) having (A) an upstream end and (B) a closed downstream end;
d. an elongated housing having (i) an upstream end, (ii) a downstream end coupled to the upstream end of the elongated flexible member, and (iii) a shoulder proximate the downstream end;
e. a sustainer gas generant contained within the elongated housing, for sustaining inflation of the inflatable member at substantially volume V for a period of time longer than is sustainable through use of the primary gas generant alone;
f. means, comprising an initiator, for igniting (i) the primary gas generant so that it combusts over a first time interval so as to generate inflation gas in a sufficient amount to inflate the inflatable member to volume V and (ii) the sustainer gas generant so that it combusts over a second time interval, ending after the first time interval, so as to generate sustainer gas in a sufficient amount to maintain inflation of the inflatable member at approximately volume V;
g. an end plug (i) positioned within the elongated housing adjacent the upstream end and (ii) carrying the initiator;
h. means, comprising (i) a first annular elastomeric foam ring positioned intermediate the end plug and the sustainer gas generant and (ii) a second annular elastomeric foam ring positioned intermediate the sustainer gas generant and the shoulder, for supporting the sustainer gas generant under slight longitudinal compression;
i. a ferrule having (i) a radially-extending flange positioned between the second annular elastomeric foam ring and the shoulder and (ii) a central aperture; and
j. an elongated ignition propagating member (i) comprising a sheath and an explosive contained therein and (ii) having (A) an upstream end received by the central aperture and (B) a downstream end positioned within the elongated flexible member.

* * * * *